Sept. 5, 1944.     H. B. COWGILL, JR     2,357,633
SPOTTING DOLLY FOR AIRPLANES AND THE LIKE
Filed Oct. 6, 1943     2 Sheets-Sheet 1
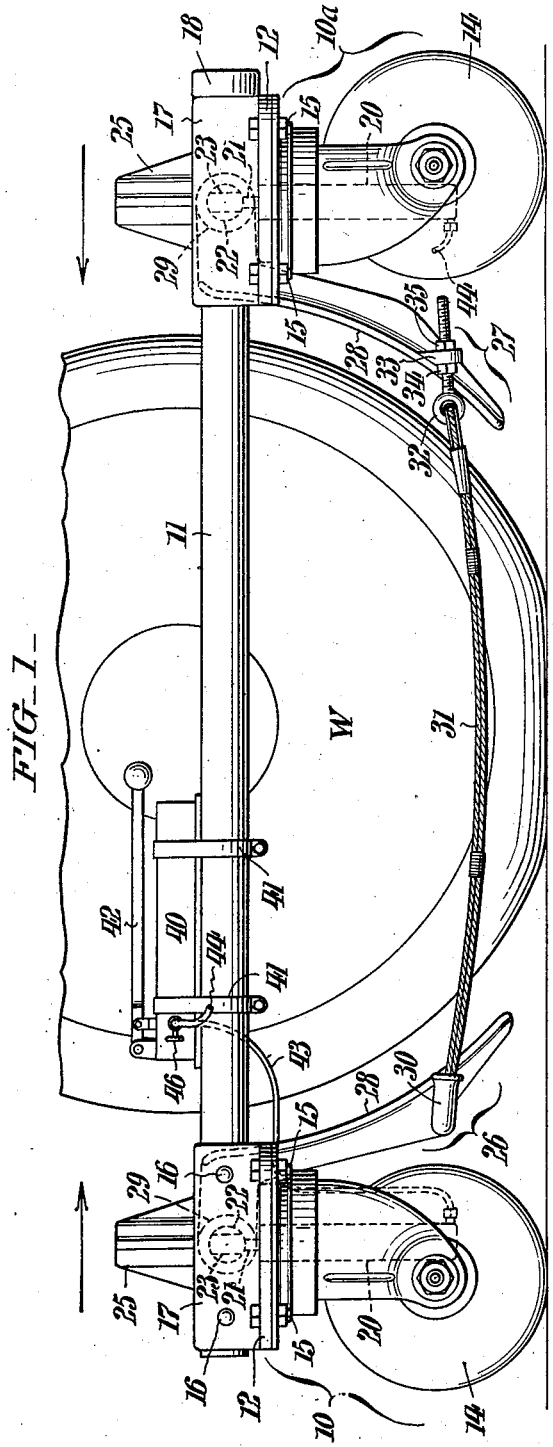
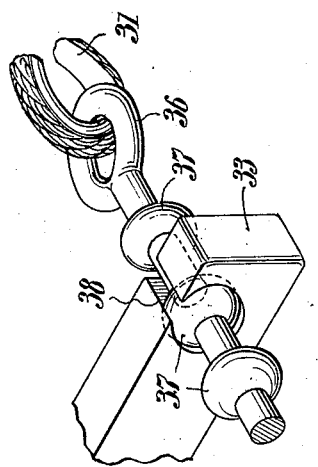
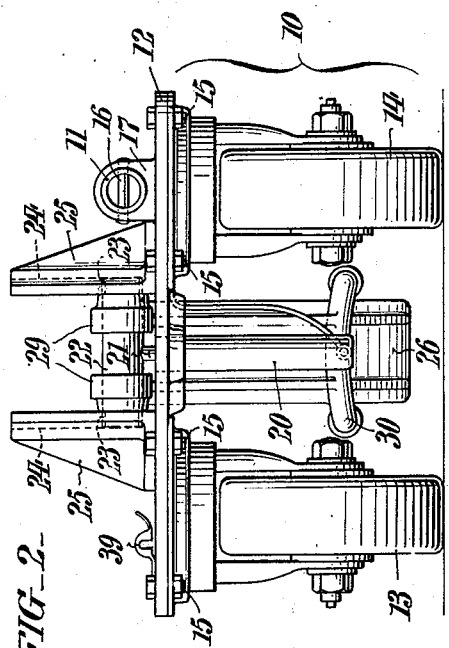
INVENTOR:
Harry B. Cowgill, Jr.,
BY Paul + Paul
ATTORNEYS.

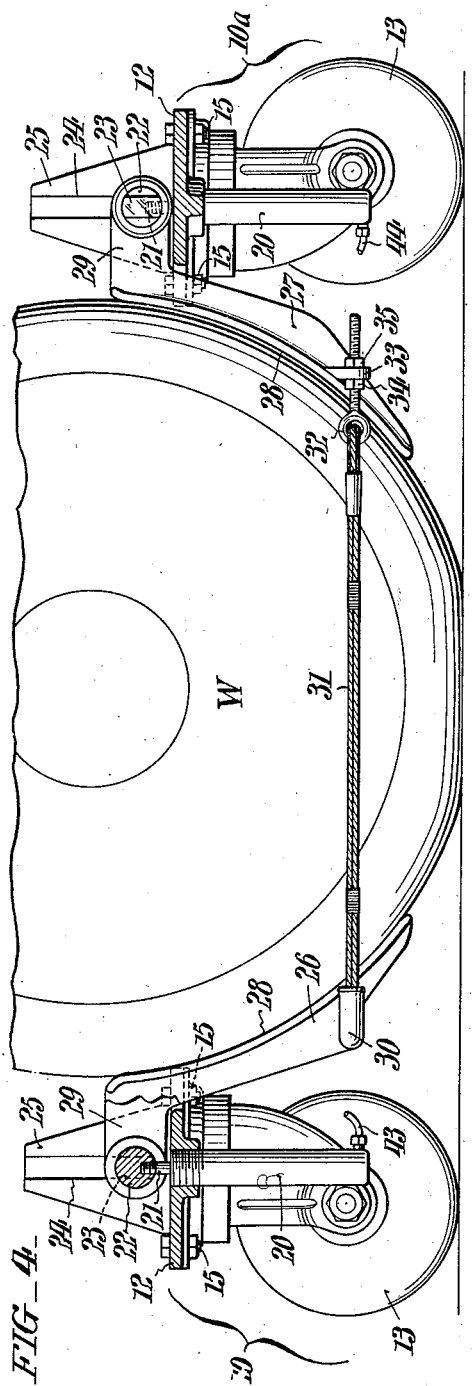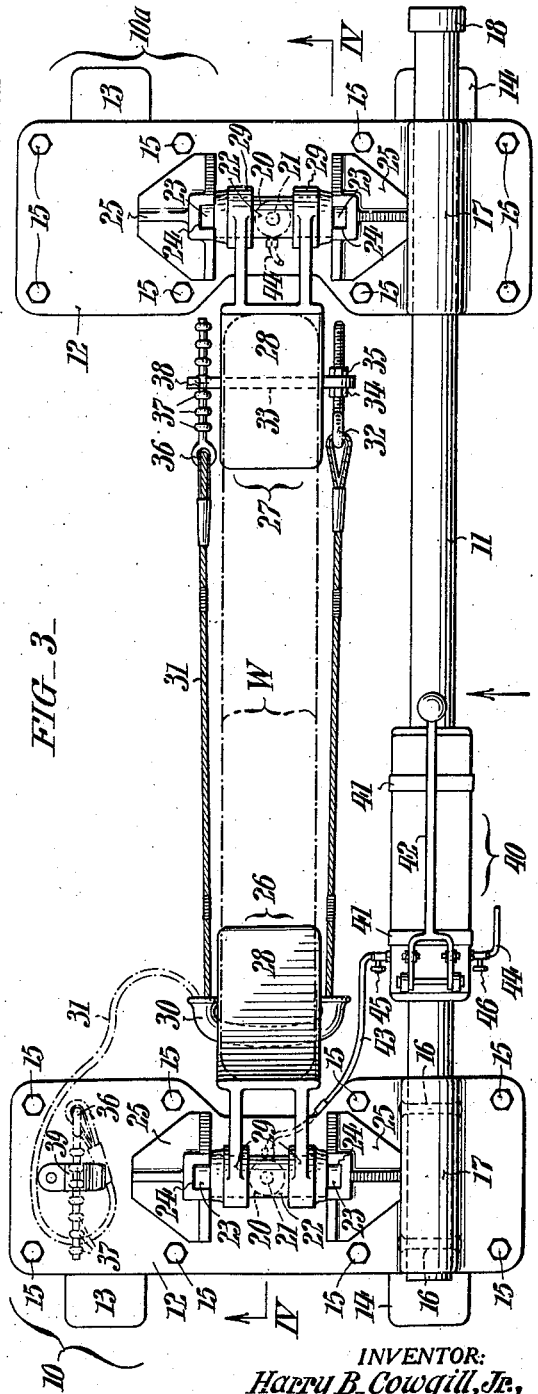

Patented Sept. 5, 1944

2,357,633

UNITED STATES PATENT OFFICE 2,357,633

SPOTTING DOLLY FOR AIRPLANES AND THE LIKE

Harry B. Cowgill, Jr., Rockville Centre, N. Y.

Application October 6, 1943, Serial No. 505,118

7 Claims. (Cl. 214—65.4)

This invention relates to spotting dollies useful more especially in handling grounded airplanes in close quarters, as for example in hangars or on the decks of carrier ships, where maneuvering of the airplanes under their own power is impractical.

In spotting dollies as ordinarily constructed heretofore, the peripheries of the wheels of the planes are engaged from opposite sides and the wheels supported clear of the hangar floor or the ship deck by shoes pivoted to the free ends of opposingly-arranged arms which are fulcrumed on a frame and adapted to be raised by lifting jacks or rams connected to said arms at points medially of their lengths. By reason of this construction, the frames and other parts of such prior art dollies are obliged to withstand tremendous strains incident to handling of heavy planes and must therefore be of correspondingly heavy construction for capacity to resist failure under load, with the result that the dollies are cumbersome and difficult to manage and, moreover costly to produce.

My invention has for its chief aim to overcome the above mentioned drawbacks, which desideratum I attain in practice as hereinafter more fully disclosed, through provision of a spotting dolly wherein the shoes are rigid with their supporting arms; wherein the lifting force is applied at the fulcra of the arms; and wherein the free ends of the arms are connectable by a flexible strand member which, when the plane is raised with its wheel in the clear, are in tension, with the plane wheel and the arms together constituting in effect a simple beam between the two lifting jacks. Thus in a spotting dolly constructed in accordance with my invention, a relatively light frame will suffice to hold the component parts of the dolly together when in no-load condition.

Other objects and attendant advantages will appear from the following detailed description of the attached drawings, wherein Fig. 1 is a view in front elevation of a spotting dolly conveniently embodying my invention, positioned adjacent a wheel of an airplane or the like which is to be lifted.

Fig. 2 is an elevation of the dolly as seen from the left of Fig. 1.

Fig. 3 shows the dolly in top plan.

Fig. 4 is a longitudinal section taken as indicated by the angled arrows IV—IV in Fig. 3; and Fig. 5 is a fragmentary detail view in perspective of certain parts which will be hereinafter more particularly referred to.

As herein illustrated, my improved spotting dolly comprises two comparatively small truck components 10 and 10a which are identical in construction and joined along one side of the dolly, with capacity for adjustment toward or away from each other, by a stout tubular coupling bar 11. Each of the trucks 10 and 10a has a horizontal frame plate 12 which is of oblong configuration in plan and sustained by a pair of laterally-spaced swivelled casters 13 and 14 of a suitable ball-bearing type, said casters being secured to the plate by screw bolts 15. As shown, one end of the coupling bar 11 is rigidly fixed, by means of rivets or pins 16, within the longitudinal bore of an integrally formed ridge or lug 17 extending transversely of one end of the frame plate 12 of the truck 10, while the other end of said bar has a sliding fit in the longitudinal bore of a ridge or lug 17 on the frame plate 12 of the truck 10a. A terminal collar 18 at the last mentioned end of the bar 11 serves as a stop to limit the extent of separation of the two trucks.

Pendent centrally from the plate 12 of each truck is a ram cylinder 20 whereof the lower end is closed, and whereof the plunger rod 21 protrudes at the top. Affixed to the top of the plunger rod 21 is a cylindrical cross head 22 having squared ends 23, see Figs. 3 and 4, which non-rotatively engage vertical grooves 24 in opposingly-arranged guide brackets 25 rising from the plate 12 of the truck.

The dolly further includes a pair of vertically-disposed arms 26 and 27 which at their lower ends have curved shoes 28 to generally conform with and engage the periphery of the plane wheel W below the wheel center. At their tops the arms 26 and 27 are laterally extended and bifurcated as at 29 and fulcrumed on the cross heads 22 of the ram plungers 21. Adjacent its lower end the shoe arm 26 has a crosswise arcuate tubular portion 30 through which a flexible connecting element in the form of a wire cable 31 is slidingly passed. Affixed to one end of the cable 31 is an anchoring eye bolt 32 whereof the shank extends through an aperture at one end of a cross bar 33 at the lower end of the shoe arm 27, and is secured by nuts 34 and 35 which bear against the opposite side faces of said cross bar. To the other end of the cable is attached an eye bolt 36 having collars 37 at intervals along its shank which are selectively engageable with a notch 38 in the opposite end of the cross bar 33 on the shoe arm 27 after the manner shown in Fig. 5. Ordinarily the detachable end of the cable 31 is prevented from dragging by engaging its eye bolt 36 in a spring holder clip 39 on the truck 10, as shown in broken lines in Fig. 3.

For the purpose of actuating the rams 20 of the two trucks I employ a suitable hydraulic pumping unit 40 which is shown as being mounted on the coupling rod 11 and secured to the latter by straps 41. The pump unit 40 is operable by means of a hand lever 42 and is in communication, by way of tubes 43 and 44, with the bottoms of the ram cylinders 20 of the respective trucks 10 and 10a, and is provided at 45 and 46 with releases which allow return flow of the liquid employed from said cylinders in a well known way. The pump unit herein shown is of course to be considered merely as indicative of other forms of pumps which may be substituted if desired or found more convenient in practice.

In use, the dolly, with its trucks 10 and 10a separated to the fullest extent and its ram plungers 21 lowered, is rolled alongside the wheel W as shown in Fig. 1, and then moved inward away from the observer until the shoes 28 are aligned in the plane of said wheel. With this accomplished the trucks 10 and 10a are shifted toward each other until the upper ends of the shoe arms 26 and 27 contact with the wheel tire, whereupon the end member 36 of the cable 31 is engaged with the notch 38 in the cross bar 33 of the shoe arm 27 and its slack incidentally taken up, and the shoes 28 caused to bear fully on the wheel tire as in Figs. 3 and 4. Finally the pump unit 40 is actuated with attendant simultaneous raising of the shoe arms 26 and 27 by the ram plungers 21, so that eventually the wheel W is raised clear of the floor or ground. With the wheel W thus raised, it will be noted that the cable 31 is placed in tension, and that the wheel and the two shoe arms 26, 27 together constitute in effect, a simple beam whereof the ends are supported by the carriages 10 and 10a. The airplane is thus supported without impartation of any longitudinal strains in the dolly tending to force the trucks apart as in the case of dollies constructed in accordance with prior art practice. Accordingly a comparatively light coupling bar 11 is all that is necessary to ordinarily hold the two trucks assembled.

From the foregoing it will be seen that I have provided a spotting dolly which, aside from having the attributes already pointed out, is simple in construction, composed of few parts, and is conducive to expeditious manufacture at small cost.

While I have described my improved spotting dolly as especially useful in maneuvering grounded airplanes, it is to be understood that the same may be employed in similarly maneuvering automobiles, trucks and other vehicles in warehouses, garages, etc.

Having thus described my invention, I claim:

1. A spotting dolly comprising a pair of spaced trucks respectively with swivel casters; vertically-arranged arms with shoes at their lower ends for engaging the periphery of an airplane wheel or the like from the opposite sides below the wheel center; means confined to up-and-down movement on the respective trucks for supporting the arms at their upper ends; coupling means along one side of the dolly for joining the trucks with capacity to be shifted toward each other so that the shoes may be brought into contact with the wheel; releasable means for connecting the lower ends of the shoe arms after the shoes have been engaged with the wheel; and means for thereafter elevating the shoe arm supports until the wheel is clear of the ground.

2. A spotting dolly according to claim 1, wherein the coupling means includes a bar which is secured at one end to one of the trucks, and which is slidingly engaged by the other truck.

3. A spotting dolly according to claim 1, wherein the coupling means includes a cylindric bar which has one of its ends secured in a horizontal bore in the frame of one of the trucks, and which slidingly passes through a similar bore in the frame of the other truck.

4. A spotting dolly according to claim 1, wherein the shoe arms are pivotally connected to their respective supports.

5. A spotting dolly according to claim 1, wherein the trucks are respectively provided with vertically-arranged hydraulic ram cylinders; wherein cross heads at the tops of the plungers of the ram cylinders constitute the supports for the shoe arms; and wherein the ends of the cross heads engage vertical slots in guides upstanding from the respective trucks.

6. A spotting dolly according to claim 1, wherein cross heads at the tops of the plungers constitute pivotal supports for the shoe arms; and wherein the ends of the cross heads engage vertical slots in guides upstanding from the respective trucks.

7. A spotting dolly according to claim 1, wherein the shoe arm connecting means is in the form of a flexible cable which slidably passes through the lower end of one of the arms, which has one of its ends anchored to the lower end of the other shoe arm at one side of the dolly, and which has slack take-up means at its other end adjustably engageable with the lower end of said other shoe arm at the opposite side of the dolly.

HARRY B. COWGILL, Jr.